(12) United States Patent
Nilsson et al.

(10) Patent No.: US 12,011,970 B2
(45) Date of Patent: Jun. 18, 2024

(54) SYSTEM AND METHOD FOR ESTIMATING CLIMATE NEEDS

(71) Applicant: Ningbo Geely Automobile Research & Development Co., Ltd., Ningbo (CN)

(72) Inventors: Magnus Nilsson, Floda (SE); Måns Pihlsgård, Gothenburg (SE)

(73) Assignee: NINGBO GEELY AUTOMOBILE RESEARCH & DEV. CO., LTD., Ningbo (CN)

( * ) Notice: Subject to any disclaimer, the term of this patent is extended or adjusted under 35 U.S.C. 154(b) by 479 days.

(21) Appl. No.: 17/317,804

(22) Filed: May 11, 2021

(65) Prior Publication Data

US 2021/0260958 A1    Aug. 26, 2021

Related U.S. Application Data

(63) Continuation of application No. PCT/CN2019/124356, filed on Dec. 10, 2019.

(30) Foreign Application Priority Data

Dec. 12, 2018    (EP) ..................................... 18211814

(51) Int. Cl.
    *B60H 1/00*    (2006.01)
    *G01K 3/06*    (2006.01)
    (Continued)

(52) U.S. Cl.
    CPC ........... *B60H 1/00742* (2013.01); *G01K 3/06* (2013.01); *G01K 3/14* (2013.01); *G01K 13/00* (2013.01); *B60H 2001/00733* (2019.05)

(58) Field of Classification Search
    CPC .............. B60H 1/00742; B60H 1/0073; B60H 2001/00733; G01K 3/06; G01K 3/14; G01K 13/00
    See application file for complete search history.

(56) References Cited

U.S. PATENT DOCUMENTS

| | | | |
|---|---|---|---|
| 6,021,956 A | 2/2000 | Haraguchi | |
| 7,497,251 B2 * | 3/2009 | Ichishi | ..................... G01K 7/42 702/135 |

(Continued)

FOREIGN PATENT DOCUMENTS

| | | | |
|---|---|---|---|
| CN | 104329768 A | 2/2015 | |
| CN | 106394173 A | 2/2017 | |

(Continued)

OTHER PUBLICATIONS

International Search Report and Written Opinion from corresponding International Application No. PCT/CN2019/124356, dated Mar. 9, 2020, 12 pages.

(Continued)

*Primary Examiner* — Miguel A Diaz
(74) *Attorney, Agent, or Firm* — Tucker Ellis LLP

(57) ABSTRACT

A method for managing a vehicle compartment temperature of at least a first vehicle compartment. The method includes determining an average temperature of a first vehicle occupant based on a temperature difference in temperature data of different areas of the at least first vehicle occupant in an image of the at least first vehicle occupant captured by at least a first infrared camera.

12 Claims, 3 Drawing Sheets

(51) Int. Cl.
*G01K 3/14* (2006.01)
*G01K 13/00* (2021.01)

(56) References Cited

U.S. PATENT DOCUMENTS

| | | |
|---|---|---|
| 9,517,679 B2 | 12/2016 | Frank |
| 11,536,480 B2* | 12/2022 | Shikii ..................... F24F 11/74 |
| 2005/0103488 A1* | 5/2005 | Ichishi ..................... G01K 7/42 |
| | | 374/E7.042 |
| 2015/0204556 A1* | 7/2015 | Kusukame ......... B60H 1/00742 |
| | | 250/338.3 |
| 2016/0363340 A1 | 12/2016 | Shikii |
| 2018/0093547 A1 | 4/2018 | Perkins |
| 2019/0084372 A1* | 3/2019 | Gallagher ............. A61B 5/6893 |
| 2019/0359169 A1* | 11/2019 | Schutera ............... B60R 21/015 |
| 2022/0396122 A1* | 12/2022 | Setterberg .............. G05D 23/27 |

FOREIGN PATENT DOCUMENTS

| | | |
|---|---|---|
| CN | 106996621 A | 8/2017 |
| CN | 107719065 A | 2/2018 |
| CN | 108973590 A | 12/2018 |
| JP | 2017136988 A | 8/2017 |

OTHER PUBLICATIONS

European Search Report from corresponding European Application No. 18211814.1, dated Jul. 1, 2019, 7 pages.

* cited by examiner

SYSTEM AND METHOD FOR ESTIMATING CLIMATE NEEDS

RELATED APPLICATION DATA

This application is a continuation of International Patent Application No. PCT/CN2019/124356, filed Dec. 10, 2019, which claims the benefit of European Patent Application No. 18211814.1, filed Dec. 12, 2018, the disclosures of which are incorporated herein by reference in their entireties.

TECHNICAL FIELD

The disclosure pertains to the field of managing the climate in a vehicle compartment.

BACKGROUND

Most vehicles today are equipped with a vehicle ventilation system for making the climate comfortable for vehicle occupants. The vehicle ventilation system commonly has a number of ventilation outlets in order to make the air in the vehicle compartment warmer or cooler. It is common to have automatic temperature control of the air that flows through the ventilation outlets. Sometimes the temperature of the air is controlled automatically by a temperature controlling device in the vehicle. In summertime vehicle occupants commonly wear less clothes due to that the outdoor temperature is warm. In wintertime vehicle occupants commonly wear more clothes due to that the outdoor temperature is cold. However, some occupants have more clothes than others during the summer and some occupants e.g. prefers to take the jacket or coat off before entering the vehicle in wintertime. Sometimes the temperature in the vehicle compartment needs to be adjusted by the occupant. When plural occupants are in a vehicle some occupants may have more clothes than other and the temperature need to be adjusted by each vehicle occupant in different vehicle compartments when that is possible. Often the temperature and e.g. the fan can be adjusted separately for the driver and the passenger, i.e. the front row is divided into two temperature controllable vehicle compartments. There are also vehicles that are equipped with further temperature controllable vehicle compartments such as the back seat.

SUMMARY

Since the comfort of the occupant is dependent on how much clothes the vehicle occupant is wearing, each vehicle occupant often have to manually adjust the temperature in the compartment depending on the clothes. There is a demand for an easier way to ensure a comfortable compartment for the vehicle occupant that reduces the need to manually adjust the temperature. Today the temperature in the vehicle compartment can be controlled by hand. In some vehicles, the temperature is adjusted by turning a knob, and a display illustrates a lower or higher temperature. Some vehicles are equipped with touch sensitive displays and the occupant can control the temperature in the vehicle compartment by interacting with the user interface of the touch sensitive display. Independent on if the vehicle occupant has to manually control the ventilation outlet by hand or via a touch sensitive display, the vehicle occupant still needs to pay a certain amount of attention to e.g. look at a touch sensitive display or to look at a knob. Sometimes one adjustment of the temperature is not enough. After a while the vehicle occupant gets too warm or too cold and there is a need to adjust the temperature once again by interacting with the knob or the touch sensitive display. In the case the vehicle occupant is a driver, the attention required for controlling the temperature in the compartment is taken from e.g. the attention to what is happening in the traffic in the surrounding of the vehicle.

An object of the present disclosure is to provide a vehicle climate control system and method for managing a vehicle compartment temperature which seek to mitigate, alleviate, or eliminate one or more of the above-identified deficiencies in the art and disadvantages singly or in any combination.

The disclosure proposes a vehicle climate control system in a vehicle for managing a vehicle compartment temperature of at least a first vehicle compartment. The vehicle climate control system comprises at least a first infrared camera configured to determine temperature data of objects in an image captured by the at least first infrared camera. The vehicle climate control system further comprises at least a first temperature controlling device configured to adjust the temperature of at least a first vehicle compartment and a processing circuitry operatively connected to the at least first infrared camera and the at least first temperature controlling device. The processing circuitry is configured to cause the vehicle climate control system to determine an average temperature of a first vehicle occupant based on a temperature difference in temperature data of different areas of the at least first vehicle occupant in an image of the at least first vehicle occupant captured by the at least first infrared. This means that the average temperature of the vehicle occupant can be determined from a distance by the at least first infrared camera that is facing the at least first vehicle occupant. According to an aspect the average temperature of the surface of the vehicle occupant is determined. The average temperature of the vehicle occupant is dependent on how much clothes the vehicle occupant is wearing, and hence the at least first infrared camera can be used for determining how much clothes the vehicle occupant is wearing.

According to an aspect the processing circuitry is further configured to cause the vehicle climate control system to identify at least a first vehicle occupant based on a temperature difference in temperature data of objects in the image captured by the at least first infrared camera. This means that the at least first infrared camera can be used to identify the at least first vehicle occupant that has a different temperature compare to other objects in the image captured by the at least first infrared camera.

According to an aspect the processing circuitry is further configured to cause the vehicle climate control system to adjust the at least first temperature controlling device to change a temperature condition of at least a first vehicle compartment based on the determined average temperature of the at least first vehicle occupant. One advantage is hence that the temperature of the at least first vehicle compartment can automatically be adjusted dependent on how much clothes the at least first vehicle occupant is wearing without the need for any interaction with a knob or user interface by the at least first vehicle occupant.

According to an aspect the processing circuitry is further configured to cause the vehicle climate control system to determine a dynamical outline of the least first vehicle occupant based on a temperature difference in temperature data of objects in the image, by continuously analyzing any change in a plurality of images captured by the at least first infrared camera. In other words, based on the temperature difference in the temperature data of the objects in the image, a contour of the least first vehicle occupant can be generated.

According to an aspect the vehicle climate control system further comprises at least one of at least a first vehicle compartment temperature sensor configured to measure the vehicle compartment temperature of at least a first vehicle compartment and at least a first ambient temperature sensor configured to measure the ambient temperature outside the vehicle, that are operatively connected to the processing circuitry. An advantage with the at least first vehicle compartment temperature sensor is that the temperature of the at least first vehicle compartment can be measured for managing the vehicle compartment temperature of at least a first vehicle compartment. An advantage with the at least first ambient temperature sensor is that the ambient temperature outside the vehicle can be measured for managing the vehicle compartment temperature of at least a first vehicle compartment.

According to an aspect the processing circuitry is further configured to cause the vehicle climate control system to determine, via a user interface, an input of a target temperature of at least a first vehicle compartment by a vehicle occupant, and measure, by an ambient temperature sensor, the ambient temperature outside the vehicle, and determine a first effective target temperature, that is an offset temperature to the target temperature, based on the ambient temperature. An advantage with this is that the first effective target temperature can be determined to be different depending on if it is warm or cold outside of the vehicle.

According to an aspect the processing circuitry is further configured to cause the vehicle climate control system to determine a second effective target temperature, that is an offset temperature to the first effective target temperature, based on the ambient temperature and the average temperature of the at least first vehicle occupant. This means that the second effective target temperature is taking the average temperature of the at least first vehicle occupant in consideration when determining the second effective target temperature. In other words, with the knowledge of how much clothes the at least first vehicle occupant is wearing, the second effective target temperature can be set to meet the target temperature input by the at least first vehicle occupant.

According to an aspect the processing circuitry is further configured to cause the vehicle climate control system to determine a first effective target temperature that is an offset temperature to a target temperature of at least a first vehicle compartment based on the average temperature of the at least first vehicle occupant. This means that the temperature of the at least a first vehicle compartment can be automatically adjusted by the at least first temperature controlling device based on the average temperature of the at least first vehicle occupant. This means that in one example there is no need to determine the ambient temperature outside the vehicle.

The disclosure further proposes a method for managing a vehicle compartment temperature of at least a first vehicle compartment. The method comprising the step of determining an average temperature of a first vehicle occupant based on a temperature difference in temperature data of different areas of the at least first vehicle occupant in an image of the at least first vehicle occupant captured by at least a first infrared camera. This means that the average temperature of the vehicle occupant can be determined from a distance by the at least first infrared camera that is facing the at least first vehicle occupant. According to an aspect the average temperature of the surface of the vehicle occupant is determined. The average temperature of the vehicle occupant is dependent on how much clothes the vehicle occupant is wearing, and hence the at least first infrared camera can be used for determining how much clothes the vehicle occupant is wearing.

According to an aspect the method further comprising the step of identifying at least a first vehicle occupant based on a temperature difference in temperature data of objects in the image captured by the at least first infrared camera. This means that the at least first infrared camera can be used to identify the least a first vehicle occupant that has a different temperature compare to other objects in the image captured by the at least first infrared camera.

According to an aspect the method further comprising the step of adjusting at least one temperature controlling device to change a temperature condition of at least a first vehicle compartment based on the determined average temperature of the at least first vehicle occupant. One advantage is hence that the temperature of the at least first vehicle compartment can automatically be adjusted dependent on how much clothes the at least first vehicle occupant is wearing without the need for any interaction with a knob or user interface by the at least first vehicle occupant.

According to an aspect the method further comprising the step of determining, via a user interface, an input of a target temperature of at least a first vehicle by a vehicle occupant, and the step of measuring, by an ambient temperature sensor, the ambient temperature outside the vehicle, and followed by the step of determining a first effective target temperature, that is an offset temperature to the target temperature, based on the ambient temperature. An advantage with this is that the first effective target temperature can be determined to be different depending on if it is warm or cold outside of the vehicle.

According to an aspect the method further comprising the step of determining a second effective target temperature, that is an offset temperature to the first effective target temperature, based on the ambient temperature and the average temperature of the at least first vehicle occupant. This means that the second effective target temperature is taking the average temperature of the at least first vehicle occupant in consideration when determining the second effective target temperature. In other words, with the knowledge of how much clothes the at least first vehicle occupant is wearing, the second effective target temperature can be set to meet the target temperature input by the at least first vehicle occupant.

According to an aspect the method further comprising the step of determining a first effective target temperature that is an offset temperature to a target temperature of at least a first vehicle compartment based on the average temperature of the at least first vehicle occupant. This means that the temperature of the at least a first vehicle compartment can be automatically adjusted by the at least first temperature controlling device based on the average temperature of the at least first vehicle occupant. This means that in one example there is no need to measure the ambient temperature outside the vehicle.

According to an aspect the method further comprising determining a dynamical outline of the least first vehicle occupant based on a temperature difference in temperature data of objects in the image, by continuously analyzing any change in a plurality of images captured by the at least first infrared camera. In other words, based on the temperature difference in the temperature data of objects in the image, a contour of the least first vehicle occupant can be generated.

According to an aspect the different areas of the at least first vehicle occupant are within the dynamical outline of the at least first vehicle occupant. One advantage with a plurality of different areas is that a more detailed temperature data can be provided for determining the average temperature of the first vehicle occupant.

According to an aspect identifying the at least first vehicle occupant comprising identifying at least a first part of the at least first vehicle occupant. In one example at least a first part is e.g. the eyes or the mouth of the at least first vehicle occupant.

According to an aspect identifying the at least first vehicle occupant further comprising object recognition for determining at least a first part of a vehicle occupant.

According to an aspect identifying the at least first vehicle occupant comprising face recognition of the at least first vehicle occupant.

According to an aspect adjusting the temperature of at least a first vehicle compartment comprising adjusting at least one of a vehicle compartment air temperature, a vehicle seat ventilation temperature, a vehicle seat heater temperature, and an infrared heating temperature to one of a first effective target temperature or a second effective target temperature based on the current vehicle compartment temperature of the at least a first vehicle compartment.

According to an aspect the average temperature of the at least first vehicle occupant is determined continuously for any change in at least one of a seating position of the at least first vehicle occupant and any change in clothes worn by the at least first vehicle occupant.

The disclosure further discloses a computer program product comprising a non-transitory computer readable medium, having thereon a computer program comprising program instructions, the computer program being loadable into a processing circuitry and configured to cause execution of the method when the computer program is run by the processing circuitry.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
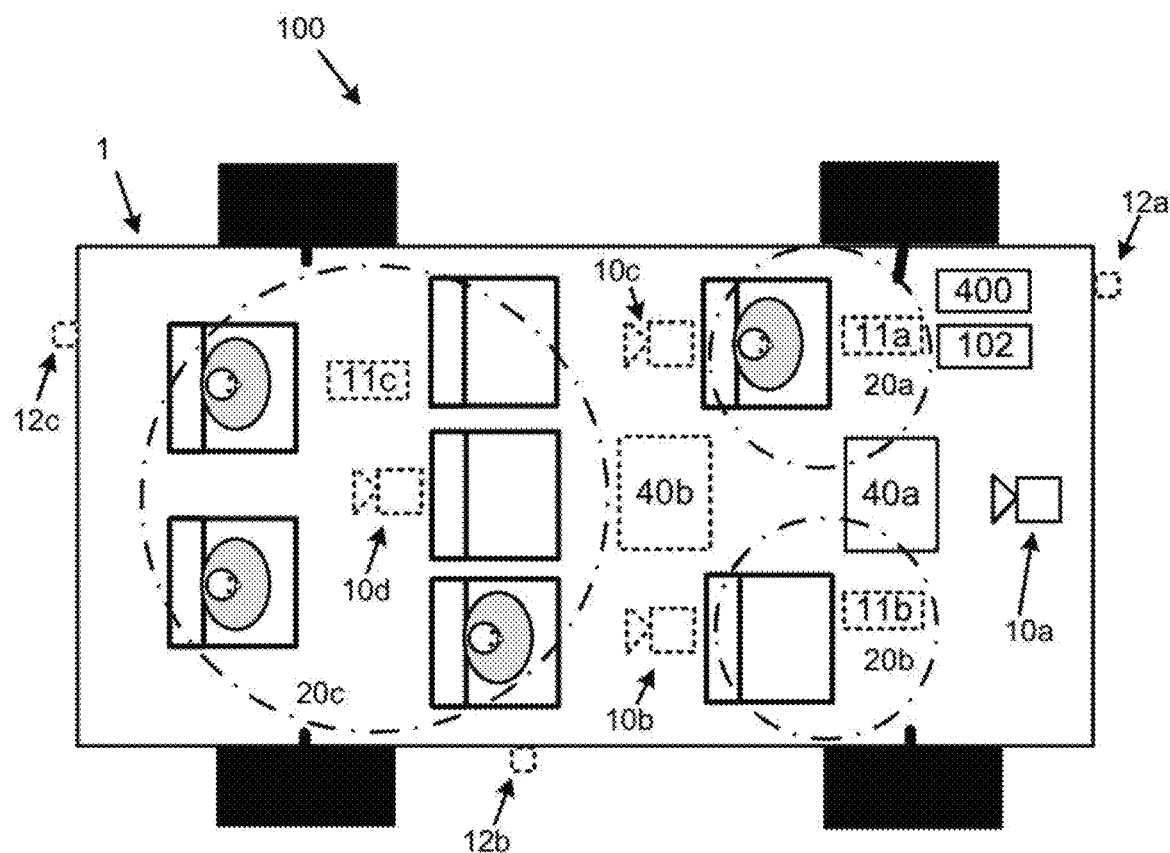
FIG. 1 illustrates a vehicle climate control system according to an aspect of the disclosure.

Aspects of the present disclosure will be described more fully hereinafter with reference to the accompanying drawings. The method and device disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Since the comfort of the occupant is dependent on how much clothes the vehicle occupant is wearing, each vehicle occupant often have to manually adjust the temperature in the compartment depending on the clothes. There is a demand for an easier way to ensure a comfortable compartment for the vehicle occupant that reduces the need to manually adjust the temperature. Today the temperature in the vehicle compartment can be controlled by hand. In some vehicles, the temperature is adjusted by turning a knob, and a display illustrates a lower or higher temperature. Some vehicles are equipped with touch sensitive displays and the occupant can control the temperature in the vehicle compartment by interacting with the user interface of the touch sensitive display. Independent on if the vehicle occupant has to manually control the ventilation outlet by hand or via a touch sensitive display, the vehicle occupant still needs to pay a certain amount of attention to e.g. look at a touch sensitive display or to look at a knob. Sometimes one adjustment of the temperature is not enough. After a while the vehicle occupant gets too warm or too cold and there is a need to adjust the temperature once again and interaction with the knob or the touch sensitive display is needed. In the case the vehicle occupant is a driver, the attention required for controlling the temperature in the compartment is taken from e.g. the attention to what is happening in the traffic in the surrounding of the vehicle.

An object of the present disclosure is to provide a vehicle climate control system and method for managing a vehicle compartment temperature which seek to mitigate, alleviate, or eliminate one or more of the above-identified deficiencies in the art and disadvantages singly or in any combination.

The disclosure proposes a vehicle climate control system 100 in a vehicle 1, that is illustrated in FIG. 1, for managing a vehicle compartment temperature of at least a first vehicle compartment 20a, 20b, 20c. The example vehicle illustrated in FIG. 1 has got three vehicle compartments 20a, 20b, 20c where the compartment temperature can be adjusted: the driver vehicle compartment 20a, the passenger vehicle compartment 20b and the back seats vehicle compartment 20c. The vehicle climate control system 100 comprises at least a first infrared camera 10a, 10b, 10c, 10d configured to determine temperature data of objects in an image captured by the at least first infrared camera 10a, 10b, 10c, 10d. In the example vehicle illustrated in FIG. 1 there are a plurality of infrared cameras 10a, 10b, 10c, 10d installed in the cabin of the vehicle. Each infrared camera 10a, 10b, 10c, 10d face at least one vehicle occupant 2a, 2b, 2c, 2d. According to an aspect a plurality of infrared cameras 10a, 10b, 10c, 10d can be installed to face the same direction for a more accurate determination of the temperature data of objects in an image.

Figure 2:
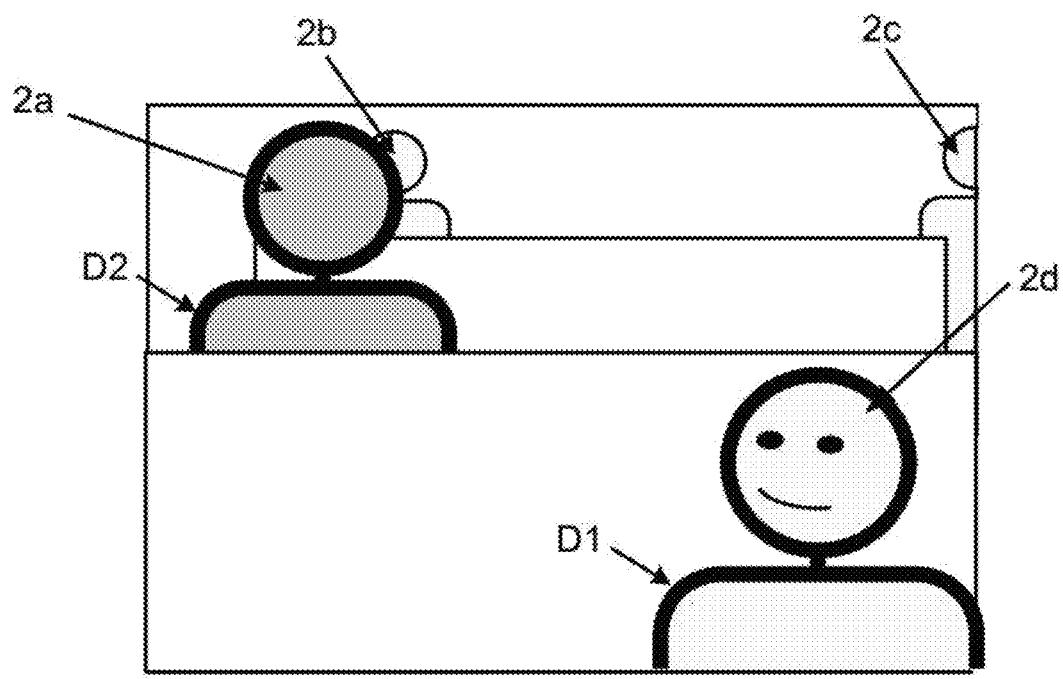
FIG. 2 illustrates an image captured by at least a first infrared camera according to an aspect of the disclosure.

FIG. 2 illustrates an example image captured by the at least first infrared camera 10a, 10b, 10c, 10d. In the example image view four vehicle occupants 2a, 2b, 2c, 2d are captured. The driver 2d in the front row, a passenger 2a in the first back seat row, and two passengers 2b, 2c in the second back seat row.

The vehicle climate control system 100 further comprises at least a first temperature controlling device 40a, 40b configured to adjust the temperature of at least a first vehicle compartment 20a, 20b, 20c. The example vehicle illustrated in FIG. 1 has got two temperature controlling devices 40a, 40b, one temperature controlling device 40a for the driver and passenger vehicle compartments 20a, 20b and one for the back seats vehicle compartment 20c. In one example the temperature controlling device has got at a plurality of air outlets for managing the vehicle compartment temperature of a plurality of vehicle compartments 20a, 20b, 20c. In the example vehicle 1 in FIG. 1, the driver vehicle compartment 20a and the passenger vehicle compartment 20b can have different compartment temperatures managed by the same temperature controlling device 40a.

According to an aspect the temperature controlling device 40a, 40b is a vehicle air condition device configured to heat and cool air. According to an aspect the temperature controlling device 40a, 40b is an air cooling device. According to an aspect the temperature controlling device 40a, 40b is an air heating device. According to an aspect the temperature controlling device 40a, 40b further comprises fans configured to regulate the air flow.

The vehicle climate control system 100 further comprises a processing circuitry 102 operatively connected to the at least first infrared camera 10a, 10b, 10c, 10d and the at least first temperature controlling device 40a, 40b.

The processing circuitry 102 is configured to cause the vehicle climate control system 100 to determine an average temperature of a first vehicle occupant 2a, 2b, 2c, 2d based on a temperature difference in temperature data of different areas A1, A2, . . . An of the at least first vehicle occupant 2a, 2b, 2c, 2d in an image of the at least first vehicle occupant 2a, 2b, 2c, 2d captured by the at least first infrared camera 10a, 10b, 10c, 10d. This means that the average temperature of the vehicle occupant can be determined from a distance by the at least first infrared camera 10a, 10b, 10c, 10d that is facing the at least first vehicle occupant 2a, 2b, 2c, 2d. According to an aspect the at least first infrared camera 10a, 10b, 10c, 10d is configured to capture images of a plurality of vehicle occupants 2a, 2b, 2c, 2d. In one example a plurality of infrared cameras 10a, 10b, 10c, 10d capture images of the same of vehicle occupants 2a, 2b, 2c, 2d. According to an aspect the average temperature of the surface of the vehicle occupant is determined. According to an aspect the average temperature of a part of the surface of the vehicle occupant is determined. The average temperature of the vehicle occupant is dependent on how much clothes the vehicle occupant is wearing, and hence the at least first infrared camera 10a, 10b, 10c, 10d can be used for determining how much clothes the vehicle occupant is wearing. In one example the vehicle occupant 2a, 2b, 2c, 2d wears clothes that are partly covering the vehicle occupant 2a, 2b, 2c, 2d.

According to an aspect the average temperature of a part of the surface of the vehicle occupant is determined, wherein the part of the surface is a part of the vehicle occupant 2a, 2b, 2c, 2d that is covered by clothes.

According to an aspect the infrared camera 10a, 10b, 10c, 10d is configured to capture images that are used for image processing and object recognition to determine what part of the vehicle occupant 2a, 2b, 2c, 2d that is covered by clothes.

According to an aspect, the average temperature of a part of the surface of the vehicle occupant is determined, wherein the part of the surface is a part of the vehicle occupant 2a, 2b, 2c, 2d that is not covered by clothes. According to an aspect the part of the vehicle occupant 2a, 2b, 2c, 2d that is not covered by clothes is any of a hand or a face. According to an aspect the part of the vehicle occupant 2a, 2b, 2c, 2d that is not covered by clothes is any of a foot, a leg, an arm, a chest or any exposed skin body part.

According to an aspect, a first average temperature T1av of the part of the surface of the vehicle occupant 2a, 2b, 2c, 2d that is not covered by clothes is determined.

According to an aspect a second average temperature T2av of the part of the surface of the vehicle occupant 2a, 2b, 2c, 2d that is covered by clothes is determined.

According to an aspect, in a determination that the first average temperature T1av is higher than the second average temperature T2av, the processing circuitry 102 is configured to cause the vehicle climate control system 100 to adjust the at least first temperature controlling device 40a, 40b to change a temperature condition of at least a first vehicle compartment 20a, 20b, 20c. In an example, this determination indicates that the clothes of the vehicle occupant is not warmed up from the inside, by the body of the vehicle occupant, but from the outside, e.g. by the sun. According to an aspect, the change of temperature condition of the at least a first vehicle compartment 20a, 20b, 20c is lowering the temperature of the at least a first vehicle compartment 20a, 20b, 20c. In an example, the clothes of the vehicle occupant is warmed up by sun rays that makes the first average temperature T1av of the clothes to be higher than the second average temperature T2av of the hands of the vehicle occupant. In an example if the vehicle occupant is wearing clothes with a dark color, the surface of the dark colored clothes can more easily get warmed up by direct sunlight onto the dark colored clothes. If the first average temperature T1av is not higher, but maybe close to the second average temperature T2av, this can be interpreted as if the vehicle occupant is wearing e.g. thin clothes that are warmed up by the body of the vehicle occupant. This can in turn be interpreted as there is a need to e.g. increase the temperature in the at least a first vehicle compartment 20a, 20b, 20c, since the vehicle occupant is wearing thing clothes. However, if it is determined that the first average temperature T1av, e.g. of the dark colored clothes, is higher than the second average temperature T2av, e.g. a hand, then one conclusion is that the clothing is warmed up from the outside, e.g. the sun is warming up the dark colored clothes, and that there is instead a desire to lower the temperature in the at least a first vehicle compartment 20a, 20b, 20c.

The disclosure further proposes vehicle climate control system 100 in a vehicle 1 for managing a vehicle compartment temperature of at least a first vehicle compartment 20a, 20b, 20c. The vehicle climate control system 100 comprises at least a first infrared camera 10a, 10b, 10c, 10d configured to determine temperature data of objects in an image captured by the at least first infrared camera 10a, 10b, 10c, 10d; at least a first temperature controlling device 40a, 40b configured to adjust the temperature of at least a first vehicle compartment 20a, 20b, 20c; and a processing circuitry 102 operatively connected to the at least first infrared camera 10a, 10b, 10c, 10d and the at least first temperature controlling device 40a, 40b. The processing circuitry 102 is configured to cause the vehicle climate control system 100 to determine a first average temperature T1av and a second average temperature T2av of a first vehicle occupant 2a, 2b, 2c, 2d based on a temperature difference in temperature data of different areas A1, A2, . . . An of the at least first vehicle occupant 2a, 2b, 2c, 2d in an image of the at least first vehicle occupant 2a, 2b, 2c, 2d captured by the at least first infrared camera 10a, 10b, 10c, 10d, wherein the infrared camera 10a, 10b, 10c, 10d is configured to capture images that are used for image processing and object recognition; and determine, using image processing and object recognition, what part of the vehicle occupant 2a, 2b, 2c, 2d that is covered by clothes, and the first average temperature T1av is determined based on a temperature difference in temperature data of a first set of different areas A11, A12, A15 that are not covered by clothes, and the second average temperature T2av is determined based on a temperature difference in temperature data of a second set of different areas A21, A22, . . . , A25 that are covered by clothes to change a temperature condition of at least a first vehicle compartment 20a, 20b, 20c.

Figure 3A:
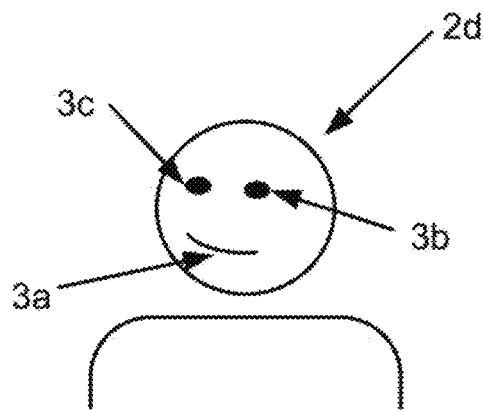
FIG. 3A illustrates an image of the at least first vehicle occupant captured by at least a first infrared camera according to an aspect of the disclosure.
Figure 3B:
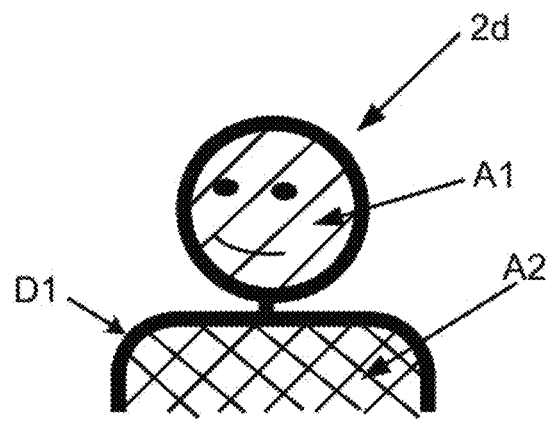
FIG. 3B illustrates an image of the at least first vehicle occupant with a determined dynamical outline and different areas according to an aspect of the disclosure.
Figure 3C:
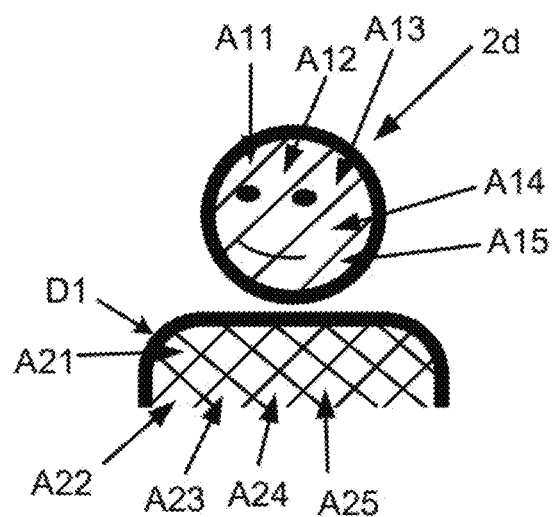
FIG. 3C illustrates an image of the at least first vehicle occupant with a determined dynamical outline and different areas according to an aspect of the disclosure.

FIG. 3C illustrates an example of a first set of different areas A11, A12, A15 that are not covered by clothes, in the example the face of the vehicle occupant. FIG. 3C further illustrates a second set of different areas A21, A22, . . . , A25 that are covered by clothes, in the example the vehicle occupant is wearing a sweater. In an example when the sun is shining, direct sunlight may cause the temperature of the sweater to increase, in particular if the sweater has a darker color.

According to an aspect, in a determination that the first average temperature T1av is higher than the second average temperature T2av, the processing circuitry 102 is configured to cause the vehicle climate control system 100 to determine that the areas A21, A22, . . . , A25 that are covered by clothes are warmed up by an external energy source other than the energy from the vehicle occupant, and adjust at least a first temperature controlling device 40a, 40b to change a temperature condition of at least a first vehicle compartment 20a, 20b, 20c accordingly.

An advantage with the determination that the first average temperature T1av is higher than the second average temperature T2av is that it can be ensured that the clothing of the vehicle occupant is not warmed up from the inside by the body of the vehicle occupant but from the outside by e.g. sunlight onto the clothing. With this knowledge, the temperature condition of the at least a first vehicle compartment 20a, 20b, 20c can be controlled accordingly e.g. dependent on further control data, in order to make it comfortable for the vehicle occupant.

According to an aspect the change of temperature condition of the at least a first vehicle compartment 20a, 20b, 20c is lowering the temperature of the at least a first vehicle compartment 20a, 20b, 20c.

According to an aspect the infrared camera 10a, 10b, 10c, 10d is continuously capturing images. According to an aspect the infrared camera 10a, 10b, 10c, 10d is a video camera.

In one example use case the infrared camera 10a, 10b, 10c, 10d captures an image of a first vehicle occupant 2d and the first vehicle occupant 2d has got a certain amount of clothes. The FIG. 3B illustrates the vehicle occupant 2d with two different areas A1, A2. The temperature data of the first area A1, as illustrated by the head, is in the example warmer compared to the temperature data of the second area A2, as illustrated by the upper chest, since in the example the first vehicle occupant 2d is wearing a winter jacket. The average temperature is in one example determined based on the temperature difference in temperature data of the first area A1 and the second area A2.

In one example use case the infrared camera 10a, 10b, 10c, 10d captures an image of a first vehicle occupant 2d that is wearing certain amount of clothes. The FIG. 3C illustrates the vehicle occupant 2d with a plurality of different areas A11, A12, A13, A14, A15, A21, A22, A23, A24 and A25. According to an aspect the average temperature of the vehicle occupant 2d is based on a temperature difference in temperature data of the different areas A21, A22, A23, A24 and A25 excluding the head of the vehicle occupant 2d.

According to an aspect, with reference to FIG. 3C, the processing circuitry 102 is configured to cause the vehicle climate control system 100 to determine an average temperature of a first vehicle occupant 2a, 2b, 2c, 2d based on a temperature difference in temperature data of different areas A21, A22, A23, A24 and A25 of the at least first vehicle occupant 2a, 2b, 2c, 2d in an image of the at least first vehicle occupant 2a, 2b, 2c, 2d captured by the at least first infrared camera 10a, 10b, 10c, 10d.

According to an aspect the processing circuitry 102 is further configured to cause the vehicle climate control system 100 to identify at least a first vehicle occupant 2a, 2b, 2c, 2d based on a temperature difference in temperature data of objects in the image captured by the at least first infrared camera 10a, 10b, 10c, 10d. This means that the at least first infrared camera 10a, 10b, 10c, 10d can be used to identify the least a first vehicle occupant 2a, 2b, 2c, 2d that has a different temperature compare to other objects in the image captured by the at least first infrared camera 10a, 10b, 10c, 10d. For example, a vehicle seat and e.g. a vehicle door window that is behind the least a first vehicle occupant 2a, 2b, 2c, 2d have different temperatures compare to the at least first vehicle occupant 2a, 2b, 2c, 2d.

According to an aspect the processing circuitry 102 is further configured to cause the vehicle climate control system 100 to adjust the at least first temperature controlling device 40a, 40b to change a temperature condition of at least a first vehicle compartment 20a, 20b, 20c based on the determined average temperature of the at least first vehicle occupant 2a, 2b, 2c, 2d. The temperature of the at least first vehicle compartment 20a, 20b, 20c can hence automatically be adjusted dependent on how much clothes the at least first vehicle occupant 2a, 2b, 2c, 2d is wearing without the need for any interaction with a knob or user interface by the at least first vehicle occupant 2a, 2b, 2c, 2d. This means that in the example where the vehicle occupant is the driver of the vehicle, more attention can be focused on what is happening in the traffic in the surrounding of the vehicle. This makes the ride in the vehicle more comfortable for any vehicle occupant by lowering the need for manually adjustments of the at least first vehicle compartment 20a, 20b, 20c.

According to an aspect the processing circuitry 102 is further configured to cause the vehicle climate control system 100 to determine a dynamical outline D1, D2 of the least first vehicle occupant 2a, 2b, 2c, 2d based on a temperature difference in temperature data of objects in the image, by continuously analyzing any change in a plurality of images captured by the at least first infrared camera 10a, 10b, 10c, 10d. In other words, based on the temperature difference in temperature data of objects in the image, a contour of the least first vehicle occupant 2a, 2b, 2c, 2d can be generated. According to an aspect, the dynamical outline D1, D2 of the least first vehicle occupant 2a, 2b, 2c, 2d is determined by image processing for identifying the least first vehicle occupant 2a, 2b, 2c, 2d. According to an aspect a movement of the least first vehicle occupant 2a, 2b, 2c, 2d is used for determining the dynamical outline D1, D2. Since the least first vehicle occupant 2a, 2b, 2c, 2d is moving in relation to the surroundings that are static, in relation to the at least first infrared camera 10a, 10b, 10c, 10d, the dynamical outline D1, D2 can be determined.

FIG. 3A illustrates an image of the at least first vehicle occupant 2d captured by at least a first infrared camera without any dynamical outline D1, D2. FIG. 3B illustrates an image of the at least first vehicle occupant 2d with a determined dynamical outline D1 together with the different areas A1, A2. FIG. 3B illustrates the dynamical outline D1 by a bold line that is following the contour of the vehicle occupant 2d. According to an aspect the dynamical outline defines a boundary of the least first vehicle occupant 2a, 2b, 2c, 2d. According to an aspect the different areas A1, A2, . . . An of the at least first vehicle occupant 2a, 2b, 2c, 2d are defined by the boundary.

According to an aspect the vehicle climate control system 100 further comprises at least one of at least a first vehicle compartment temperature sensor 11a, 11b, 11c configured to measure the vehicle compartment temperature of at least a first vehicle compartment 20a, 20b, 20c and at least a first ambient temperature sensor 12a, 12b, 12c configured to measure the ambient temperature outside the vehicle 1, that are operatively connected to the processing circuitry 102. In FIG. 1 the compartment temperature sensors 11a, 11b, 11c are located within each of the driver vehicle compartment 20a, the passenger vehicle compartment 20b and the back seats vehicle compartment 20c. The FIG. 1 further exemplifies the location of the ambient temperature sensor 12a, 12b, 12c.

According to an aspect the at least first vehicle compartment temperature sensor 11a, 11b, 11c is placed so that an average temperature of the at least first vehicle compartment 20a, 20b, 20c is measured. According to an aspect the at least a first ambient temperature sensor 12a, 12b, 12c is placed so that an average temperature of the ambient temperature outside the vehicle 1 is measured. In one example the average temperature of plural vehicle compartment temperature sensors 11a, 11b, 11c is used for determining an average temperature of plural vehicle compartments 20a, 20b, 20c. In one example the average temperature of plural ambient temperature sensors 12a, 12b, 12c is used for determining an average ambient temperature outside the vehicle 1.

According to an aspect the vehicle climate control system 100 further comprises a user interface 400 operatively connectable to the processing circuitry 102. According to an aspect the user interface 400 is configured to output information to an occupant of the vehicle 1. According to an aspect the user interface 400 is configured to receive input information from an occupant of the vehicle 1. According to an aspect the user interface 400 is any of a touch sensitive display, a display combined with a keyboard, a knob, a key, a switch or a voice controlled user interface.

According to an aspect the processing circuitry 102 is further configured to cause the vehicle climate control system 100 to determine, via a user interface 400, an input of a target temperature of at least a first vehicle compartment 20a, 20b, 20c by a vehicle occupant 2a, 2b, 2c, 2d, and measure, by an ambient temperature sensor 12a, 12b, 12c, the ambient temperature outside the vehicle, and determine a first effective target temperature, that is an offset temperature to the target temperature, based on the ambient temperature. In an example use case the vehicle occupant turns a knob to set a certain target temperature, e.g. 20.5 degrees centigrade. Dependent on the ambient temperature outside the vehicle, the first effective target temperature is set, wherein the first effective target temperature is different compare to the target temperature input by the at least first vehicle occupant 2a, 2b, 2c, 2d. The first effective target temperature can be determined to be different depending on if it is warm or cold outside of the vehicle. In an example, the first effective target temperature is set to be lower compare to the target temperature input by the at least first vehicle occupant 2a, 2b, 2c, 2d if it is cold outside of the vehicle. This can be a predefined offset by the vehicle manufacturer, or predefined by the vehicle occupant, that is based on that it is likely that the at least first vehicle occupant 2a, 2b, 2c, 2d wears more clothes when it is cold outside of the vehicle.

According to an aspect the processing circuitry 102 is further configured to cause the vehicle climate control system 100 to determine a second effective target temperature, that is an offset temperature to the first effective target temperature, based on the ambient temperature and the average temperature of the at least first vehicle occupant 2a, 2b, 2c, 2d. This means that the second effective target temperature is taking the average temperature of the at least first vehicle occupant 2a, 2b, 2c, 2d in consideration when determining the second effective target temperature. In other words, with the knowledge of how much clothes the at least first vehicle occupant 2a, 2b, 2c, 2d is wearing, the second effective target temperature can be set to meet the target temperature input by the at least first vehicle occupant 2a, 2b, 2c, 2d.

According to an aspect the processing circuitry 102 is further configured to cause the vehicle climate control system 100 to determine a first effective target temperature that is an offset temperature to a target temperature of at least a first vehicle compartment 20a, 20b, 20c based on the average temperature of the at least first vehicle occupant 2a, 2b, 2c, 2d. This means that the temperature of the at least a first vehicle compartment 20a, 20b, 20c can be automatically adjusted by the at least first temperature controlling device 40a, 40b based on the average temperature of the at least first vehicle occupant 2a, 2b, 2c, 2d. This means that in one example there is no need to measure the ambient temperature outside the vehicle.

Figure 4:
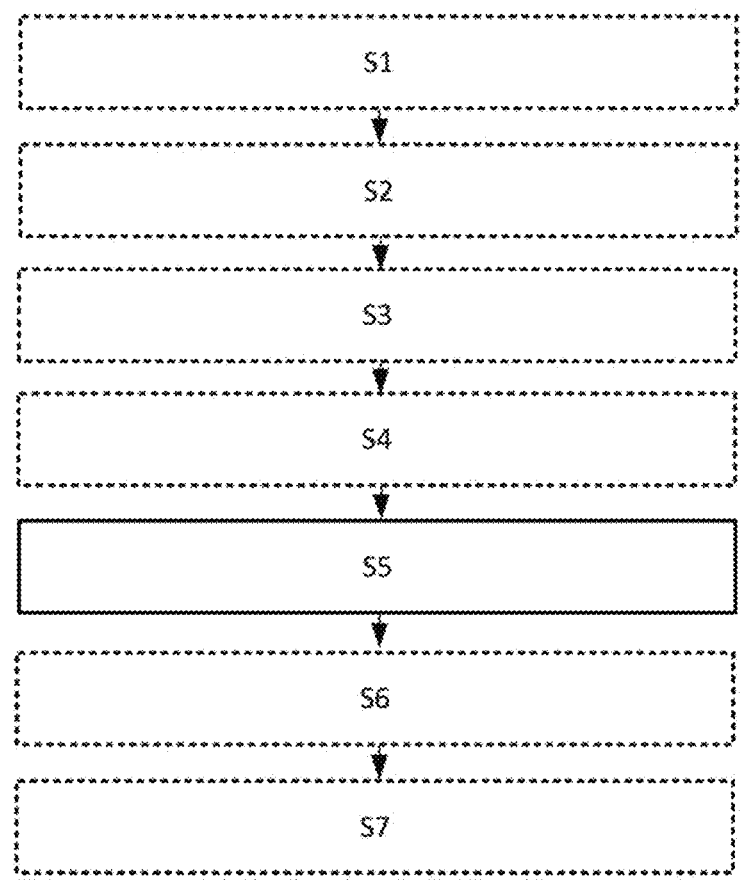
FIG. 4 illustrates a flow chart of the method steps according to some aspects of the disclosure.

The disclosure further proposes a method for managing a vehicle compartment temperature of at least a first vehicle compartment 20a, 20b, 20c, 20d. FIG. 4 illustrates a flow chart of the method steps according to some aspects of the disclosure. The method comprising the step of S5 determining an average temperature of a first vehicle occupant 2a, 2b, 2c, 2d based on a temperature difference in temperature data of different areas A1, A2, . . . An of the at least first vehicle occupant 2a, 2b, 2c, 2d in an image of the at least first vehicle occupant 2a, 2b, 2c, 2d captured by at least a first infrared camera 10a, 10b, 10c, 10d. This means that the average temperature of the vehicle occupant can be determined from a distance by the at least first infrared camera 10a, 10b, 10c, 10d that is facing the at least first vehicle occupant 2a, 2b, 2c, 2d. According to an aspect the average temperature of the surface of the vehicle occupant is determined. The average temperature of the vehicle occupant is dependent on how much clothes the vehicle occupant is wearing, and hence the at least first infrared camera 10a, 10b, 10c, 10d can be used for determining how much clothes the vehicle occupant is wearing.

According to an aspect the method further comprising the step of S4 identifying at least a first vehicle occupant 2a, 2b, 2c, 2d based on a temperature difference in temperature data of objects in the image captured by the at least first infrared camera 10a, 10b, 10c, 10d. This means that the at least first infrared camera 10a, 10b, 10c, 10d can be used to identify the least a first vehicle occupant 2a, 2b, 2c, 2d that has a different temperature compare to other objects in the image captured by the at least first infrared camera 10a, 10b, 10c, 10d. For example, a vehicle seat and e.g. a vehicle door window that is behind the least a first vehicle occupant 2a, 2b, 2c, 2d have different temperatures compare to the at least first vehicle occupant 2a, 2b, 2c, 2d.

According to an aspect the method further comprising the step of S7 adjusting at least one temperature controlling device 40a, 40b to change a temperature condition of at least a first vehicle compartment 20a, 20b, 20c based on the determined average temperature of the at least first vehicle occupant 2a, 2b, 2c, 2d. The temperature of the at least first vehicle compartment 20a, 20b, 20c can hence automatically be adjusted dependent on how much clothes the at least first vehicle occupant 2a, 2b, 2c, 2d is wearing without the need for any interaction with a knob or user interface by the at least first vehicle occupant 2a, 2b, 2c, 2d. This means that in the example where the vehicle occupant is the driver of the vehicle, more attention can be focused on what is happening in the traffic in the surrounding of the vehicle. This makes the ride in the vehicle more comfortable for any vehicle occupant by lowering the need for manually adjustments of the at least first vehicle compartment 20a, 20b, 20c.

According to an aspect the method further comprising the step of S1 determining, via a user interface 400, an input of a target temperature of at least a first vehicle compartment 20a, 20b, 20c by a vehicle occupant 2a, 2b, 2c, 2d, and the step of S2 measuring, by an ambient temperature sensor 12a, 12b, 12c, the ambient temperature outside the vehicle, and followed by the step of S3 determining a first effective target temperature, that is an offset temperature to the target temperature, based on the ambient temperature. Hence, dependent on the ambient temperature outside the vehicle, the first effective target temperature is set, wherein the first effective target temperature is different compare to the target temperature input by the at least first vehicle occupant 2a, 2b, 2c, 2d. The first effective target temperature can hence be determined to be different depending on if it is warm or cold outside of the vehicle. In an example, the first effective target temperature is set to be lower compare to the target temperature input by the at least first vehicle occupant 2a, 2b, 2c, 2d if it is cold outside of the vehicle. This can be a predefined offset that is based on that it is likely that the at least first vehicle occupant 2a, 2b, 2c, 2d wears more clothes when it is cold outside of the vehicle.

According to an aspect the method further comprising the step of S6 determining a second effective target temperature, that is an offset temperature to the first effective target temperature, based on the ambient temperature and the average temperature of the at least first vehicle occupant 2a, 2b, 2c, 2d. This means that the second effective target temperature is taking the average temperature of the at least first vehicle occupant 2a, 2b, 2c, 2d in consideration when determining the second effective target temperature. In other words, with the knowledge of how much clothes the at least first vehicle occupant 2a, 2b, 2c, 2d is wearing, the second effective target temperature can be set to meet the target temperature input by the at least first vehicle occupant 2a, 2b, 2c, 2d.

According to an aspect the method further comprising the step of determining a first effective target temperature that is an offset temperature to a target temperature of at least a first vehicle compartment 20a, 20b, 20c based on the average temperature of the at least first vehicle occupant 2a, 2b, 2c, 2d. This means that the temperature of the at least a first vehicle compartment 20a, 20b, 20c can be automatically adjusted by the at least first temperature controlling device 40a, 40b based on the average temperature of the at least first vehicle occupant 2a, 2b, 2c, 2d. This means that in one example there is no need to measure the ambient temperature outside the vehicle.

According to an aspect the method further comprising determining a dynamical outline D1, D2 of the least first vehicle occupant 2a, 2b, 2c, 2d based on a temperature difference in temperature data of objects in the image, by continuously analyzing any change in a plurality of images captured by the at least first infrared camera 10a, 10b, 10c, 10d. In other words, based on the temperature difference in temperature data of objects in the image, a contour of the least first vehicle occupant 2a, 2b, 2c, 2d can be generated. According to an aspect, the dynamical outline D1, D2 of the least first vehicle occupant 2a, 2b, 2c, 2d is determined by image processing for identifying the least first vehicle occupant 2a, 2b, 2c, 2d. According to an aspect a movement of the least first vehicle occupant 2a, 2b, 2c, 2d is used for determining the dynamical outline D1, D2. Since the least first vehicle occupant 2a, 2b, 2c, 2d is moving in relation to the surroundings that are static and in relation to the at least first infrared camera 10a, 10b, 10c, 10d, that is static, the dynamical outline D1, D2 can be determined.

According to an aspect plural dynamical outlines D1, D2 of plural vehicle occupants 2a, 2b, 2c, 2d can be determined by the at least first infrared camera 10a, 10b, 10c, 10d. FIG. 2 illustrates that dynamical outlines D1, D2 for the two vehicle occupants 2a, 2d have been determined. According to an aspect the relative seating position of the least first vehicle occupant 2a, 2b, 2c, 2d in the vehicle is used for adjusting the at least one temperature controlling device 40a, 40b to change the temperature condition of the at least a first vehicle compartment 20a, 20b, 20c where the at least first vehicle occupant 2a, 2b, 2c, 2d is positioned in the vehicle. The relative seating position of the at least first vehicle occupant 2a, 2b, 2c, 2d is in one example determined by image processing of the captured image together with seating position data of the vehicle in relation to the camera position data. This means that independent of where the least first vehicle occupant 2a, 2b, 2c, 2d is seated, respectively temperature controlling device 40a, 40b can be controlled to provide a certain temperature in the respectively vehicle compartment 20a, 20b, 20c where the least first vehicle occupant 2a, 2b, 2c, 2d is seated in the vehicle.

In an example use case one vehicle occupant may sit in the back seat without any jacket on, in a t-shirt, and another vehicle occupant may sit in the passenger seat with both a jacket and a hat on. Even if both vehicle occupants have set the desired temperature to 20 degrees centigrade, the vehicle climate control system 100 will automatically adjust the effective target temperature in respectively vehicle compartment differently to meet the expectation of climate comfort by each vehicle occupant.

Figure 3D:
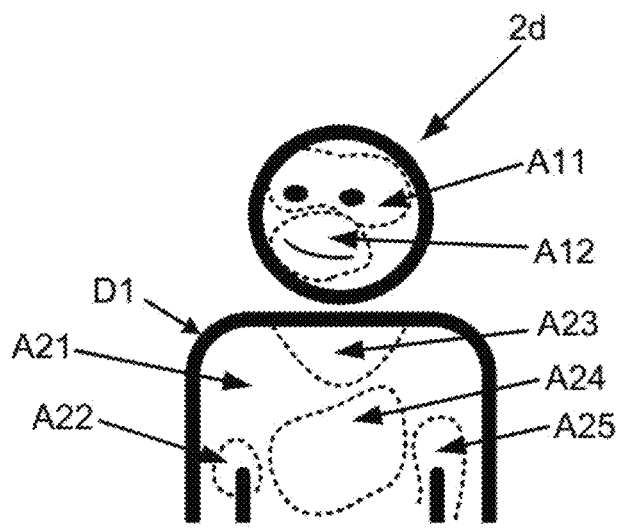
FIG. 3D illustrates an image of the at least first vehicle occupant with a determined dynamical outline and different areas according to an aspect of the disclosure.

According to an aspect the different areas A1, A2, . . . An of the at least first vehicle occupant 2a, 2b, 2c, 2d are within the dynamical outline D1, D2 of the at least first vehicle occupant 2a, 2b, 2c, 2d. According to an aspect the dynamical outline D1, D2 of the at least first vehicle occupant 2a, 2b, 2c, 2d defines a boundary of the at least first vehicle occupant 2a, 2b, 2c, 2d. There may be a plurality of different areas A1, A2, . . . An. FIG. 3B illustrates two different areas A1, A2. FIG. 3C illustrates a plurality of different areas A11-A15 and A21-A25. According to an aspect the different areas are defined by a predefined grid or array of areas in the captured image. According to an aspect the areas are defined by the different temperature data of the different areas of the at least first vehicle occupant 2a, 2b, 2c in the image of the at least first vehicle occupant 2a, 2b, 2c. FIG. 3D illustrates areas A11-A12, A21-A25 that are defined by the temperature data. In FIG. 3D e.g. the temperature within the area A24 is approximately the same, while the temperature within the area A22 has a different temperature etc.

According to an aspect the number of different areas A1, A2, . . . An is set by the at least first infrared camera 10a, 10b, 10c, 10d. According to an aspect the average temperature of the first vehicle occupant 2a, 2b, 2c, 2d is based on a temperature difference in temperature data of different areas A1, A2, . . . An of the at least first vehicle occupant 2a, 2b, 2c, 2d. According to an aspect the sensitivity of the at least first infrared camera 10a, 10b, 10c, 10d can be set to only detect a certain temperature difference in the temperature data of the different areas A1, A2, . . . An. By using a plurality of different areas A1, A2, . . . An is a more detailed temperature data can be provided for determining the average temperature of the first vehicle occupant 2a, 2b, 2c, 2d. A plurality of different areas A1, A2, . . . An further improves identifying at least a first vehicle occupant 2a, 2b, 2c, 2d based on a temperature difference in temperature data of objects in the image captured by the at least first infrared camera 10a, 10b, 10c, 10d.

According to an aspect, as illustrated in FIG. 3A, identifying the at least first vehicle occupant 2a, 2b, 2c comprising identifying at least a first part 3a, 3b, 3c of the at least first vehicle occupant 2a, 2b, 2c. In one example at least a first part 3a, 3b, 3c is e.g. the eyes or the month of the at least first vehicle occupant 2a, 2b, 2c. According to an aspect identifying the at least first vehicle occupant 2a, 2b, 2c further comprising object recognition for determining at least a first part 3a, 3b, 3c of a vehicle occupant 2a, 2b, 2c. According to an aspect identifying the at least first vehicle occupant 2a, 2b, 2c comprising face recognition of the at least first vehicle occupant 2a, 2b, 2c.

According to an aspect adjusting the temperature of the least a first vehicle compartment 20a, 20b, 20c comprising adjusting at least one of a vehicle compartment air temperature, a vehicle seat ventilation temperature, a vehicle seat heater temperature, and an infrared heating temperature to one of a first effective target temperature or a second effective target temperature based on the current vehicle compartment temperature of the at least a first vehicle compartment 20a, 20b, 20c.

According to an aspect the average temperature of the at least first vehicle occupant 2a, 2b, 2c is determined continuously for any change in at least one of a seating position of the at least first vehicle occupant 2a, 2b, 2c and any change in clothes worn by the at least first vehicle occupant 2a, 2b, 2c.

Figure 5:
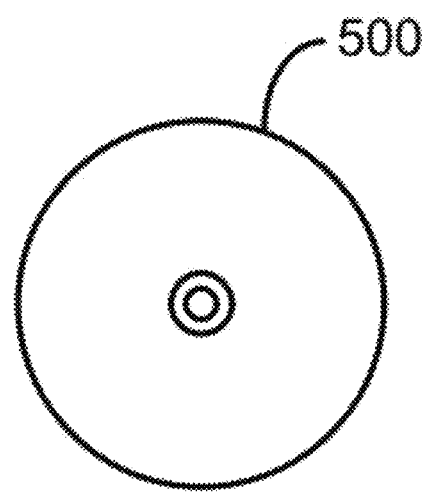
FIG. 5 illustrates a computer program product according to some aspects of the disclosure.

The disclosure further proposes, as illustrated in FIG. 5, a computer program product 500 comprising a non-transitory computer readable medium, having thereon a computer program comprising program instructions, the computer program being loadable into a processing circuitry 102 and configured to cause execution of the method when the computer program is run by the at least one processing circuitry 102.

According to an aspect the vehicle climate control system 100 is configured to carry out any or more of the aspects of the described method. According to an aspect of the disclosure, the method is carried out by instructions in a software program that is downloaded and run in the vehicle climate control system 100.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method for managing a vehicle compartment temperature of at least a first vehicle compartment, the method comprising:
    determining, via a user interface, an input of a target temperature of the at least first vehicle compartment by a first vehicle occupant;
    measuring, by an ambient temperature sensor, the ambient temperature outside the vehicle;
    measuring, by at least a first infrared camera, a first temperature associated with a part of the vehicle occupant that is not covered by clothing and a second temperature associated with a second part of the vehicle occupant that is covered by clothing;
    determining a first effective target temperature, that is an offset temperature to the target temperature, based on the ambient temperature;
    determining an average temperature of the first vehicle occupant based on a temperature difference in temperature data of different areas of the first vehicle occupant in an image of the first vehicle occupant captured by the at least first infrared camera;
    comparing the first temperature with the second temperature;
    determining a second effective target temperature, that is an offset temperature to the first effective target temperature, based on the ambient temperature and the average temperature of the first vehicle occupant; and
    adjusting at least one temperature controlling device to change a temperature condition of the at least first vehicle compartment based on the determined average temperature of the at least first vehicle occupant and based on the comparison between the first temperature and the second temperature.

2. The method according to claim 1, the method further comprising:
   identifying the first vehicle occupant based on a temperature difference in temperature data of objects in the image captured by the at least first infrared camera.

3. A non-transitory computer readable medium storing a computer program comprising program instructions, the computer program being loadable into a processing circuitry and configured to cause execution of the method according to claim 1 when the computer program is run by the processing circuitry.

4. The method according to claim 1, the method further comprising:
   determining a dynamical outline of the least first vehicle occupant based on a temperature difference in temperature data of objects in the image, by continuously analyzing any change in a plurality of images captured by the at least first infrared cam era.

5. The method according to claim 4, wherein the different areas of the at least first vehicle occupant are within the dynamical outline of the at least first vehicle occupant.

6. The method of claim 1, wherein the adjusting comprises:
   upon determining that the first temperature is greater than the second temperature, make a determination that the part of the vehicle occupant that is not covered by clothing is heated by an external energy source other than heat emitted from the vehicle occupant, and
   adjusting the at least one temperature controlling device to adjust the temperature condition of the at least first vehicle compartment accordingly.

7. The method of claim 6, wherein the at least one temperature controlling device is adjusted to decrease the temperature condition of the at least first vehicle compartment.

8. A vehicle climate control system in a vehicle for managing a vehicle compartment temperature of at least a first vehicle compartment, the vehicle climate control system comprises:
   at least a first vehicle compartment temperature sensor configured to measure a temperature of the at least first vehicle compartment;
   at least a first ambient temperature sensor configured to measure the ambient temperature outside the vehicle;
   at least a first infrared camera configured to determine temperature data of objects in an image captured by the at least first infrared camera;
   at least a first temperature controlling device configured to adjust the temperature of the at least first vehicle compartment; and
   a processing circuitry operatively connected to the at least first infrared camera and the at least first temperature controlling device, the processing circuitry is configured to cause the vehicle climate control system to:
      determine, via a user interface, an input of a target temperature of the at least first vehicle compartment by a first vehicle occupant;
      measure, by the first ambient temperature sensor, the ambient temperature outside the vehicle;
      measure, by the at least first infrared camera, a first temperature associated with a part of the vehicle occupant that is not covered by clothing and a second temperature associated with a second part of the vehicle occupant that is covered by clothing;
      determine a first effective target temperature, that is an offset temperature to the target temperature, based on the ambient temperature;
      determine an average temperature of the first vehicle occupant based on a temperature difference in temperature data of different areas of the first vehicle occupant in an image of the first vehicle occupant captured by the at least first infrared camera;
      compare the first temperature with the second temperature;
      determine a second effective target temperature, that is an offset temperature to the first effective target temperature, based on the ambient temperature and the average temperature of the first vehicle occupant; and
      adjust at least one temperature controlling device to change a temperature condition of the at least first vehicle compartment based on the determined average temperature of the at least first vehicle occupant and based on the comparison between the first temperature and the second temperature.

9. The vehicle climate control system according to claim 8, wherein the processing circuitry is further configured to cause the vehicle climate control system to:
   identify the first vehicle occupant based on a temperature difference in temperature data of objects in the image captured by the at least first infrared camera.

10. The vehicle climate control system according to claim 8, wherein the processing circuitry is further configured to cause the vehicle climate control system to:
   determine a dynamical outline of the first vehicle occupant based on a temperature difference in temperature data of objects in the image, by continuously analyzing any change in a plurality of images captured by the at least first infrared cam era.

11. The vehicle climate control system according to claim 8, wherein the adjusting comprises:
   determining that the first temperature is greater than the second temperature and determining that the part of the vehicle occupant that is not covered by clothing is heated by an external energy source other than heat emitted from the vehicle occupant, and
   adjusting the at least one temperature controlling device to adjust the temperature condition of the at least first vehicle compartment accordingly.

12. The vehicle climate control system according to claim 11, wherein the at least one temperature controlling device is adjusted to decrease the temperature condition of the at least first vehicle compartment.

* * * * *